United States Patent
Kim et al.

(10) Patent No.: US 10,867,111 B2
(45) Date of Patent: Dec. 15, 2020

(54) METHODS OF FABRICATING SEMICONDUCTOR DEVICES, AND RELATED LAYOUT DESIGN SYSTEMS

(71) Applicant: Samsung Electronics Co., Ltd., Suwon-si (KR)

(72) Inventors: Jae Hwan Kim, Hwaseong-si (KR); Jae Hyun Kang, Yongin-si (KR); Byung Chul Shin, Seoul (KR); Ki Heung Park, Suwon-si (KR); Seung Weon Paek, Yongin-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/439,299

(22) Filed: Jun. 12, 2019

(65) Prior Publication Data

US 2020/0159884 A1    May 21, 2020

(30) Foreign Application Priority Data

Nov. 16, 2018  (KR) .................... 10-2018-0141497

(51) Int. Cl.
| | |
|---|---|
| *G06F 30/398* | (2020.01) |
| *G06N 5/04* | (2006.01) |
| *G06N 20/00* | (2019.01) |
| *G06F 30/392* | (2020.01) |
| *G06F 30/394* | (2020.01) |
| *G06F 119/12* | (2020.01) |

(52) U.S. Cl.
CPC .............. *G06F 30/398* (2020.01); *G06N 5/04* (2013.01); *G06N 20/00* (2019.01); *G06F 2119/12* (2020.01)

(58) Field of Classification Search
CPC .............. G06F 30/398; G06F 2119/12; G06F 2119/22; G06F 30/392; G06F 30/394; G06N 20/00; G06N 5/04; G06N 20/10; H01L 27/0207
See application file for complete search history.

(56) References Cited

U.S. PATENT DOCUMENTS

| | | |
|---|---|---|
| 8,336,001 B2 | 12/2012 | Chang et al. |
| 8,402,397 B2 | 3/2013 | Robles et al. |
| 8,464,194 B1 | 6/2013 | Agarwal et al. |
| 8,539,421 B2 | 9/2013 | Agarwal et al. |
| 8,689,159 B1 | 4/2014 | Palmer et al. |
| 9,189,589 B2 | 11/2015 | Muddu et al. |
| 9,594,867 B2 | 3/2017 | Yu et al. |
| 9,626,459 B2 | 4/2017 | Agarwal et al. |
| 9,871,039 B2 | 1/2018 | Pelloie et al. |
| 9,977,856 B2 | 5/2018 | Robles |

(Continued)

*Primary Examiner* — Vuthe Siek
(74) *Attorney, Agent, or Firm* — Myers Bigel, P. A.

(57) ABSTRACT

Methods of fabricating semiconductor devices are provided. A method of fabricating a semiconductor device includes selecting a target pattern from a target design layout. The target pattern includes: a target net; a target via that is electrically connected to the target net; and a crossing net that is electrically connected to the target via on a different level from the target net. The method includes analyzing a peripheral pattern that is adjacent the target net. Moreover, the method includes generating a redundant net, and a redundant via that electrically connects the redundant net and the crossing net. Related layout design systems are also provided.

19 Claims, 23 Drawing Sheets

(56) References Cited

U.S. PATENT DOCUMENTS

| | | | |
|---|---|---|---|
| 2003/0054575 A1* | 3/2003 | Brennan | H01L 21/76838 438/14 |
| 2009/0113366 A1* | 4/2009 | Serdar | G06F 30/3312 716/113 |
| 2010/0162194 A1* | 6/2010 | Qian | G06F 30/394 716/52 |
| 2017/0061062 A1 | 3/2017 | Liebmann et al. | |
| 2017/0177783 A1 | 6/2017 | Hong | |
| 2018/0330493 A1* | 11/2018 | Milligan | G06T 7/0004 |

* cited by examiner

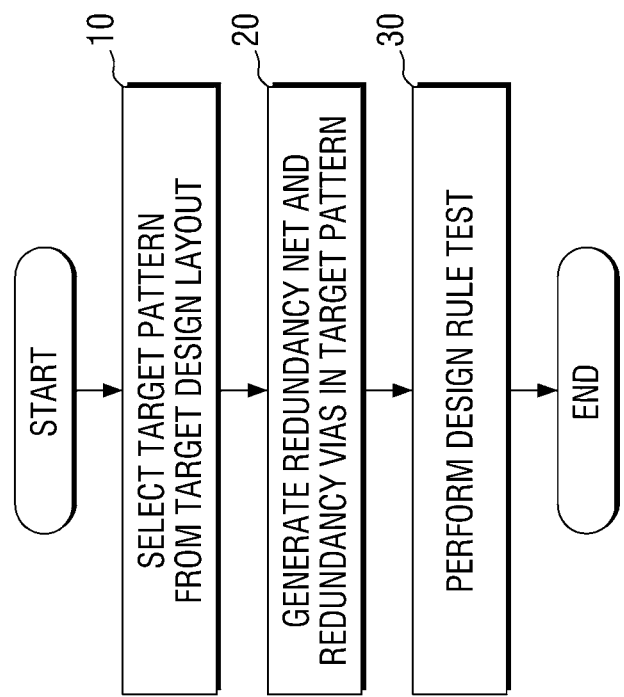

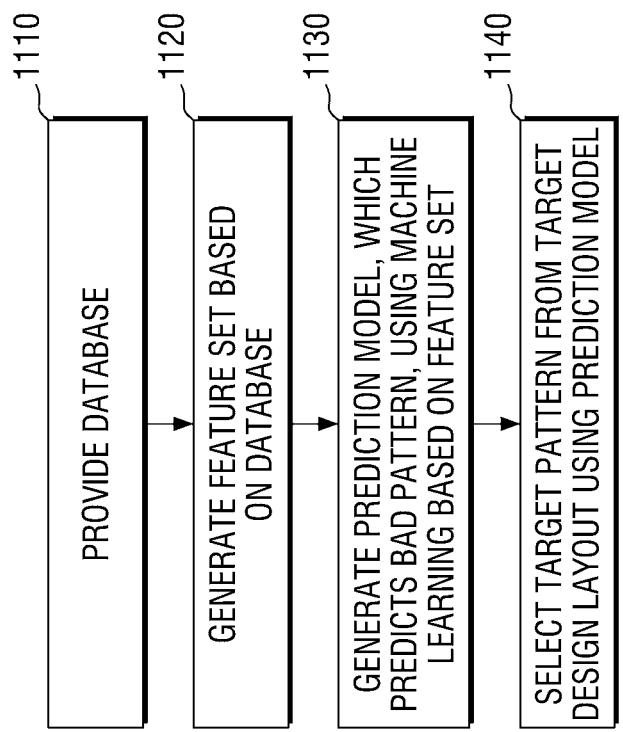

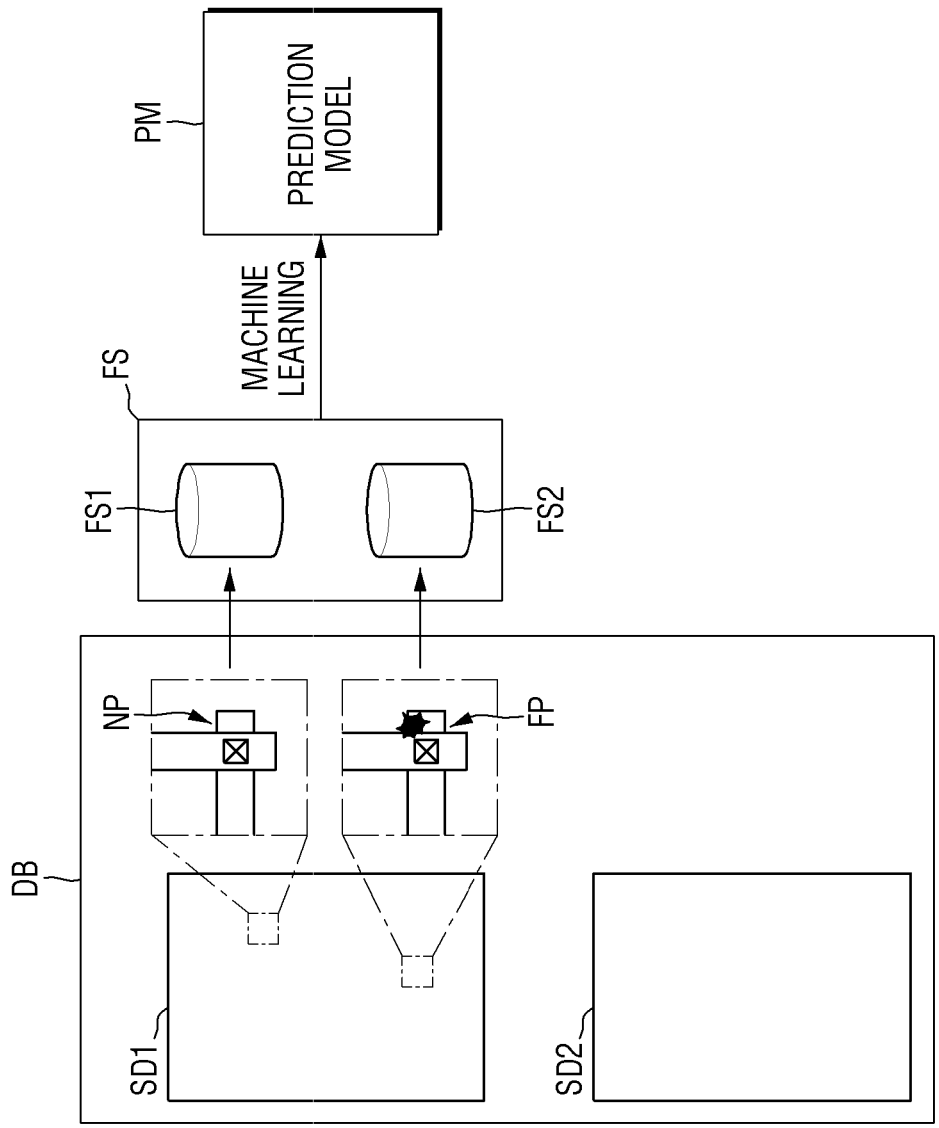

METHODS OF FABRICATING SEMICONDUCTOR DEVICES, AND RELATED LAYOUT DESIGN SYSTEMS

This application claims priority to Korean Patent Application No. 10-2018-0141497, filed on Nov. 16, 2018, and all the benefits accruing therefrom under 35 U.S.C. § 119, the disclosure of which is incorporated herein by reference in its entirety.

BACKGROUND

The present disclosure relates to methods of fabricating a semiconductor device. As the fabrication of semiconductor devices has become more sophisticated, demand for miniaturized semiconductor devices has increased. To fabricate a miniaturized semiconductor device, a layout design capable of securing the reliability of a finished device may be advantageous.

SUMMARY

Embodiments of the present disclosure provide a method of fabricating a semiconductor device that is capable of improving the yield, reliability, and processability of a semiconductor device.

Embodiments of the present disclosure also provide a layout design system that is capable of improving the yield, reliability, and processability of a semiconductor device.

However, the inventive concepts of the present disclosure are not restricted to the example embodiments set forth herein.

According to some embodiments of the present disclosure, a method of fabricating a semiconductor device may include providing a database including design information and process information of the semiconductor device. The method may include generating a prediction model by performing machine learning using a feature set that is based on the database. The prediction model may predict a bad pattern of the semiconductor device. The method may include selecting a target pattern from a target design layout using the prediction model. The target pattern may include: a target net; a target via that is electrically connected to the target net; and a crossing net that is electrically connected to the target via on a different level from the target net. The method may include analyzing a peripheral pattern that is adjacent the target net. The method may include generating a redundant net that intersects the crossing net on the same level as the target net, and a redundant via that electrically connects the redundant net and the crossing net, based on the analyzing the peripheral pattern. Moreover, the method may include checking the redundant net and the redundant via for whether the redundant net and the redundant via satisfy a predetermined design rule.

A method of fabricating a semiconductor device, according to some embodiments, may include providing a target design layout of the semiconductor device. The method may include selecting a target pattern from the target design layout. The target pattern may include: a target net that extends in a first direction; a first target via that is electrically connected to the target net; and a first crossing net that is electrically connected to the first target via and extends in a second direction that intersects the first direction on a different level, in a third direction that intersects the first direction and the second direction, from the target net. The method may include analyzing a peripheral pattern that is adjacent the target net. The peripheral pattern may include a first peripheral net and a second peripheral net that extend in the first direction on the same level, in the third direction, as the target net and are spaced apart from each other in the second direction. The method may include generating a redundant net that extends in the first direction on the same level, in the third direction, as the target net, between the first peripheral net and the second peripheral net. Moreover, the method may include generating a first redundant via that electrically connects the redundant net and the first crossing net.

A method of fabricating a semiconductor device, according to some embodiments, may include providing a target design layout of the semiconductor device. The method may include selecting a target pattern from the target design layout. The target pattern may include: a target net that extends in a first direction; a first target via that is electrically connected to the target net; a second target via that is spaced apart from the first target via and is electrically connected to the target net; a first crossing net that is electrically connected to the first target via and extends in a second direction that intersects the first direction on a different level, in a third direction that intersects the first direction and the second direction, from the target net; and a second crossing net that is electrically connected to the second target via and extends in the second direction on the different level, or on another different level in the third direction, from the target net. The method may include analyzing a peripheral pattern that is adjacent the target net. The peripheral pattern may include a first peripheral net that extends in the first direction on the same level, in the third direction, as the target net and is spaced apart from the target net in the second direction. The method may include generating a first redundant net that extends in the first direction on the same level, in the third direction, as the target net. The first peripheral net may be between the target net and the first redundant net. Moreover, the method may include generating a first redundant via that electrically connects the first redundant net and the first crossing net, and a second redundant via that electrically connects the first redundant net and the second crossing net.

A layout design system, according to some embodiments, may include a processor. The layout design system may include a selection unit configured to select a target pattern from a target design layout of a semiconductor device, using the processor. Moreover, the layout design system may include a generation unit configured to generate a redundant net and a redundant via in the target pattern, using the processor. The target pattern may include: a target net; a target via that is electrically connected to the target net; and a first crossing net that is electrically connected to the target via on a different level from the target net. The generation unit may include an analysis module that is configured to analyze a peripheral pattern that is adjacent the target net. The generation unit may include a generation module that is configured to generate the redundant net based on the peripheral pattern that is analyzed. The redundant net may intersect the first crossing net on the same level as the target net. The redundant via may electrically connect the redundant net and the first crossing net. Moreover, the generation unit may include a check module that is configured to check the redundant net and the redundant via for whether the redundant net and the redundant via satisfy a predetermined design rule.

BRIEF DESCRIPTION OF THE DRAWINGS

The above and other objects and features of the inventive concepts will become apparent by describing in detail example embodiments thereof with reference to the attached drawings, in which:

FIG. 1 is a flowchart illustrating a method of fabricating a semiconductor device according to some embodiments of the present disclosure.

FIG. 2A is a flowchart illustrating Block 10 of FIG. 1.

FIG. 2B is a schematic view illustrating Block 10 of FIG. 1.

DETAILED DESCRIPTION

A method of fabricating a semiconductor device according to some embodiments of the present disclosure will hereinafter be described with reference to FIGS. 1 through 17.

Figure 3A:
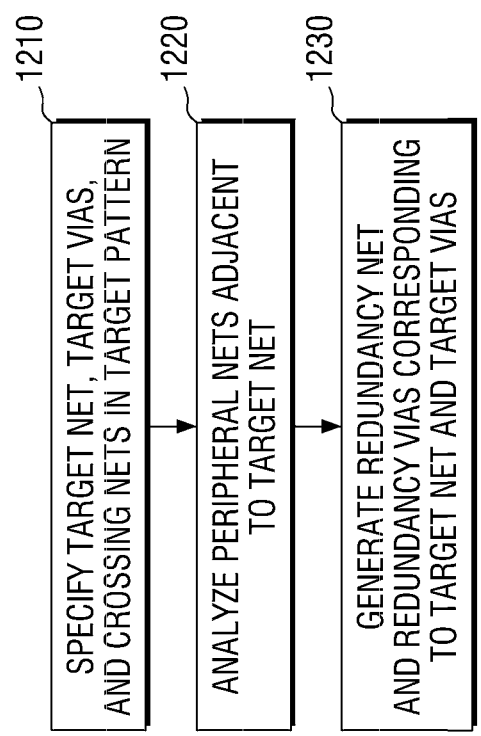
FIG. 3A is a flowchart illustrating Block 20 of FIG. 1.
Figure 3B:
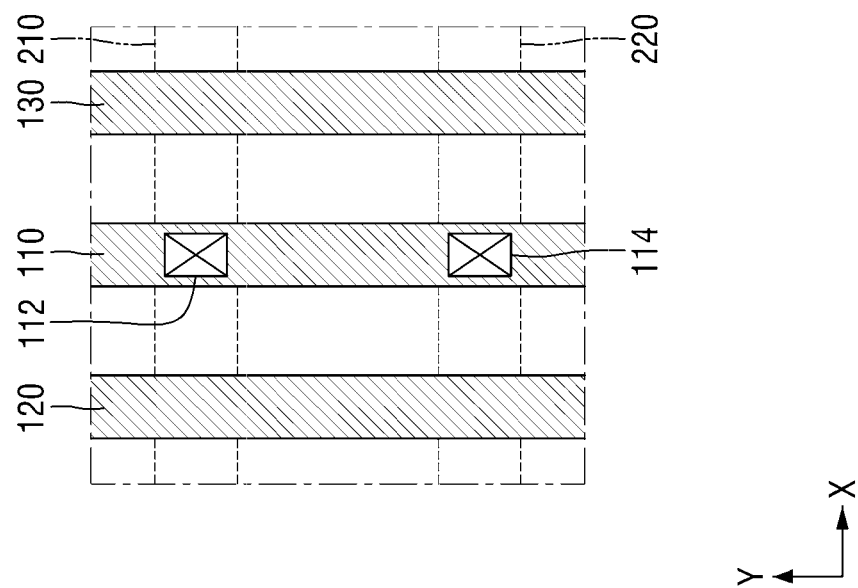
FIG. 3B is a layout view illustrating Block 20 of FIG. 1.
Figure 4:
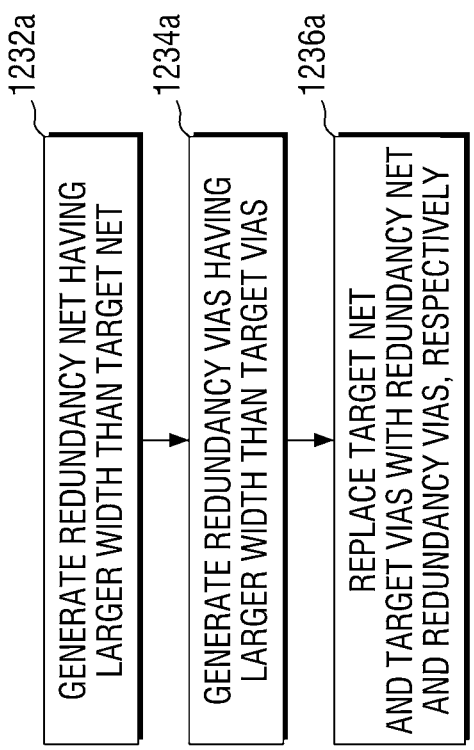
FIG. 4 is a flowchart illustrating the generation of a redundant net and redundant vias according to some embodiments of the present disclosure.
Figure 5:
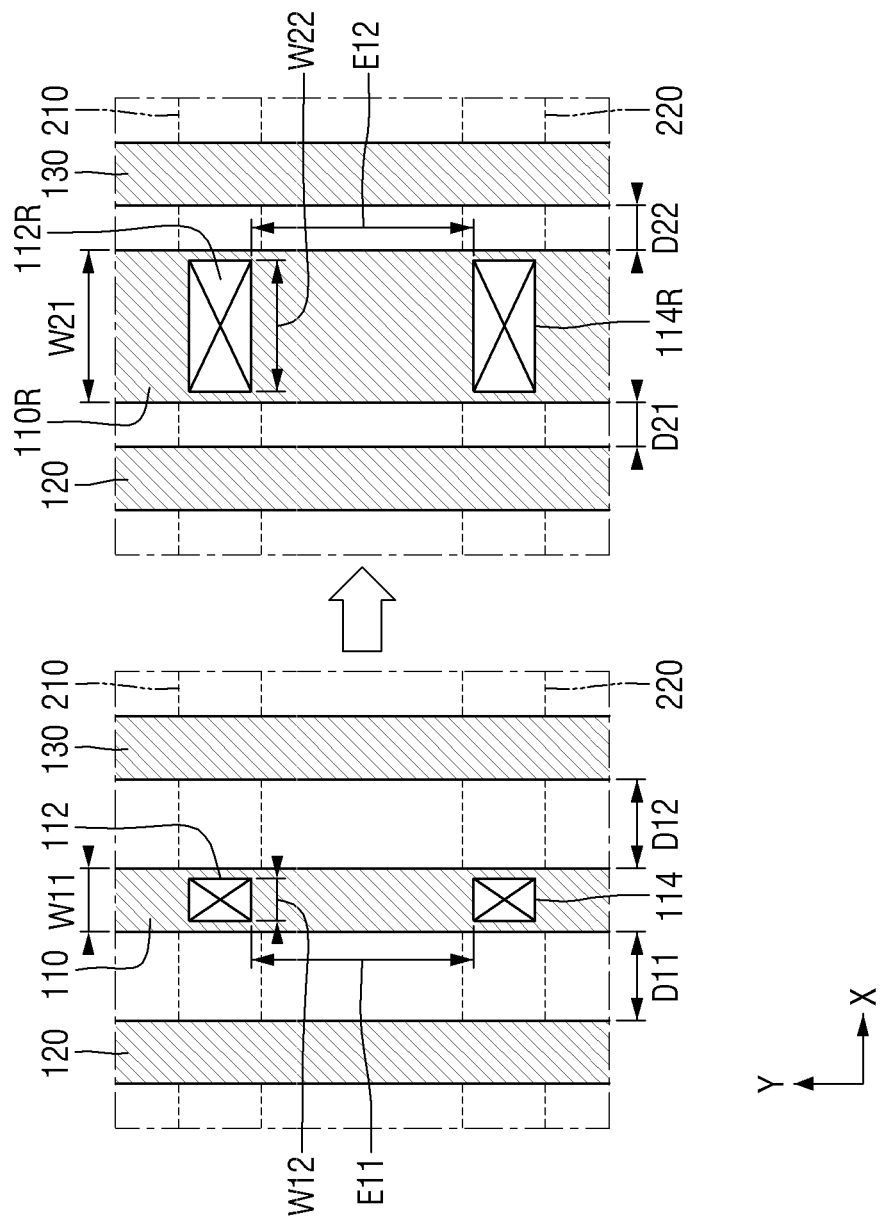
FIG. 5 is a schematic view illustrating the generation of a redundant net and redundant vias according to FIG. 4.

FIG. 1 is a flowchart illustrating a method of fabricating a semiconductor device according to some embodiments of the present disclosure. FIG. 2A is a flowchart illustrating Block 10 of FIG. 1. FIG. 2B is a schematic view illustrating Block 10 of FIG. 1. FIG. 3A is a flowchart illustrating Block 20 of FIG. 1. FIG. 3B is a layout view illustrating Block 20 of FIG. 1. FIG. 4 is a flowchart illustrating the generation of a redundant net and redundant vias according to some embodiments of the present disclosure. FIG. 5 is a schematic view illustrating the generation of a redundant net and redundant vias according to FIG. 4.

Referring to FIG. 1, a method of fabricating a semiconductor device according to some embodiments of the present disclosure includes selecting a target pattern from a target design layout (Block 10), forming (e.g., generating) a redundant net and redundant vias in the target pattern (Block 20), and performing a design rule test (Block 30). As used herein, the terms "redundant" and "redundancy" may be used interchangeably.

Referring to FIGS. 1, 2A, and 2B, the selection of the target pattern from the target design layout, i.e., Block 10, may include providing/accessing a database DB (Block 1110), generating a feature set FS from the database DB (Block 1120), generating a prediction model PM, which predicts a bad pattern, using machine learning based on the feature set FS (Block 1130), and selecting the target pattern from the target design layout using the prediction model PM (Block 1140).

Specifically, the database DB may be provided/accessed first (Block 1110). The database DB may include, for example, design information and process information of a semiconductor device.

The design information may include a design layout drawing and information processed through simulation based on the design layout drawing, but the present disclosure is not limited thereto. That is, the design information is not limited to a particular form of data.

The process information may include information specifying process conditions of a semiconductor device corresponding to a particular node (e.g., 7 nanometers (nm), 8 nm, 10 nm, 14 nm, etc.), information defining a bad pattern based on experimental values obtained under the process conditions, and simulation information regarding the process conditions, but the present disclosure is not limited thereto. That is, the process information is not limited to a particular form of data.

The database DB may be provided by multiple semiconductor devices. For example, design information and process information of a first semiconductor device SD1 may be provided to a first database, and design information and process information of a second semiconductor device SD2, which is different from the first semiconductor device SD1, may be provided to a second database.

Thereafter, the feature set FS may be generated from the database DB (Block 1120). The generation of the feature set FS may include, for example, separating a normal pattern NP and a bad pattern FP of a semiconductor device from the database DB. For example, as illustrated in FIG. 2B, the feature set FS may include a first feature set FS1 including the features of a normal pattern NP (or a non-hot spot) of the first semiconductor device SD1 and a second feature set FS2 including the features of a bad pattern FP (or a hot spot) of the first semiconductor device SD1.

Thereafter, the prediction model PM, which predicts a defective pattern of a semiconductor device, may be generated using machine learning based on the feature set FS (Block 1130). For example, a machine learning process may be performed based on the first and second feature sets FS1 and FS2. As a result, the prediction model PM, which predicts a bad pattern of a semiconductor device, may be generated.

The machine learning process may include at least one of, for example, support vector machine (SVM) learning, clustering, classification, regression, and a combination thereof, but the present disclosure is not limited thereto.

Thereafter, the target pattern may be selected from the target design layout using the prediction model PM (Block 1140). As a result, the target pattern, which is predicted to be a bad pattern, may be selected from the target design layout.

Referring to FIGS. 1, 3A, and 3B, the generation of the redundant net and the redundant vias in the target pattern, i.e., Block 20, may include specifying a first target net 110, first and second target vias 112 and 114, and first and second crossing nets 210 and 220 in the target pattern (Block 1210), analyzing first and second peripheral nets 120 and 130 adjacent to the first target net 110 (Block 1220), and forming (e.g., generating) a redundant net and redundant vias corresponding to the first target net 110 and the target vias 112 and 114 (Block 1230).

The term "net", as used herein, refers to wiring in the target design layout. For example, a net may include interconnections, routings, and metal lines in the target design layout.

The target pattern will hereinafter be described as having a configuration illustrated in FIG. 3B. For example, as illustrated in FIG. 3B, the target pattern may include the first target net 110, the first crossing net 210, the second crossing net 220, the first target via 112, and the second target via 114, but the present disclosure is not limited thereto. The target pattern may have various configurations other than that illustrated in FIG. 3B.

Specifically, the first target net 110, the first and second target vias 112 and 114, and the first and second crossing nets 210 and 220 in the target pattern may be specified (e.g., selected/identified) (Block 1210).

The first target net 110 may be a net that is predicted to be bad in the target design layout. The first target net 110 may, for example, extend in a first direction Y.

The first and second crossing nets 210 and 220 may be nets intersecting the first target net 110. For example, the first crossing net 210 may extend in a second direction X that crosses the first direction Y, and the second crossing net 220 may be spaced apart from the first crossing net 210 in the first direction Y and may extend in the second direction X.

The first and second crossing nets 210 and 220 may be disposed on a different level, in a third (e.g., vertical) direction that intersects (e.g., is perpendicular to) the first direction Y and the second direction X, from the first target net 110. FIG. 3B illustrates the first and second crossing nets 210 and 220 as being disposed in a lower level than the first target net 110, but the present disclosure is not limited thereto. Alternatively, one of the first and second crossing nets 210 and 220 may be disposed in a higher level than the first target net 110, or the first and second crossing nets 210 and 220 may both be disposed in a higher level than the first target net 110.

The first target via 112 may electrically connect the first target net 110 and the first crossing net 210, which are disposed on different levels. The second target via 114 may be spaced apart from the first target via 112 and may electrically connect the first target net 110 and the second crossing net 220, which are disposed on different levels. For example, in a case where the first and second crossing nets 210 and 220 are disposed on the same level, the first and second target vias 112 and 114 may be disposed on the same level.

FIG. 3B illustrates the first target net 110 as extending in the first direction Y beyond the first and second target vias 112 and 114, but the present disclosure is not limited thereto. For example, at least one of the first and second target vias 112 and 114 may be disposed at an end of the first target net 110 as long as the first and second target vias 112 and 114 can be electrically connected to the first target net 110. For example, the first target via 112 may be disposed at one end of the first target net 110, and the second target via 114 may be disposed at the other end of the first target net 110.

Similarly, FIG. 3B illustrates the first and second crossing nets 210 and 220 as extending the second direction X beyond the first and second target vias 112 and 114, respectively, but the present disclosure is not limited thereto. In some embodiments, the first target via 112 may be disposed at one end of the first crossing net 210, and the second target via 114 may be disposed at one end of the second crossing net 220.

Thereafter, the first and second peripheral nets 120 and 130, which are adjacent to the first target net 110, may be analyzed (Block 1220).

For example, the first and second peripheral nets 120 and 130 may be disposed adjacent to the first target net 110. The first and second peripheral nets 120 and 130 may, for example, extend in the first direction Y. The first and second peripheral nets 120 and 130 may be spaced apart from the first target net 110 in the second direction X.

In some embodiments, the first peripheral net 120 may be disposed adjacent to one side of the first target net 110, and the second peripheral net 130 may be disposed adjacent to the other side of the first target net 110. That is, the first target net 110 may be interposed between the first and second peripheral nets 120 and 130.

FIG. 3B illustrates the first and second peripheral nets 120 and 130 as intersecting both the first and second crossing nets 210 and 220, but the present disclosure is not limited thereto. In some embodiments, the first and second peripheral nets 120 and 130 may not intersect at least one of the first and second crossing nets 210 and 220.

The generation of first and second redundant vias 112R and 114R (FIG. 5), i.e., Block 1234a (FIG. 4), may be performed after the generation of a redundant net 110R, i.e., Block 1232a, but the present disclosure is not limited thereto. For example, the generation of the first and second redundant vias 112R and 114R (Block 1234a) may be performed before the generation of the redundant net 110R (Block 1232a), or the generation of the first and second redundant vias 112R and 114R (Block 1234a) and the generation of the redundant net 110R (Block 1232a) may be performed at the same time.

Thereafter, a redundant net and redundant vias corresponding to the first target net 110 and the first and second target vias 112 and 114 may be generated (Block 1230). Block 1230 will be described later with reference to FIGS. 4 through 18.

Referring again to FIG. 1, a design rule test may be performed (Block 30). For example, a determination may be made as to whether the generated redundant net and the generated redundant vias satisfy a predetermined design rule.

In some embodiments, if the generated redundant net and the generated redundant vias satisfy the predetermined design rule, a resultant design layout including the generated redundant net and the generated redundant vias may be provided. A semiconductor device may be built (i.e., physically fabricated) with a metal layer and metal vias that correspond to the generated redundant net and the generated redundant vias, respectively, after determining that the generated redundant net and the generated redundant vias satisfy the predetermined design rule. On the other hand, if the generated redundant net and the generated redundant vias do not satisfy the predetermined design rule, the generated redundant net and the generated redundant vias may be removed from the target design layout.

In some embodiments, the selection of the target pattern from the target design layout, i.e., Block 10, may be performed in various manners other than that described above with reference to FIGS. 2A and 2B.

For example, information regarding a net that considerably affects the performance of a semiconductor device may be provided along with design information of the semiconductor device, and the corresponding net may be selected as the target pattern. For example, a clock net used in the synchronization of a semiconductor device, a power net inputting power to, or outputting power from, a semiconductor device, or a timing-critical net used in determining the timings of signals input to, or output from, a semiconductor device may be selected as the target pattern.

Also, for example, the target pattern may not necessarily be defined in the method described above with reference to FIGS. 2A and 2B. In this case, an arbitrary pattern that can add a redundant net or redundant vias within the target design layout may be selected as the target pattern.

Referring to FIGS. 4 and 5, the generation of a redundant net and redundant vias as performed in the method of fabricating a semiconductor device according to FIG. 1, i.e., Block 1230 (FIG. 3A), may include generating a redundant net 110R having a larger width, in the second direction X, than the first target net 110 (Block 1232a), generating first redundant vias 112R and 114R having a larger width, in the second direction X, than the first and second target vias 112 and 114 (Block 1234a), and replacing the first target net 110 and the first and second target vias 112 and 114 with the redundant net 110R and the first and second redundant vias 112R and 114R, respectively (Block 1236a).

Specifically, the redundant net 110R, which has a larger width than the first target net 110, may be generated (Block 1232a). The redundant net 110R may be a net that can prevent/inhibit any defect that can be generated in the target design layout by the first target net 110. The redundant net 110R may, for example, extend on the same level as the first target net 110 along the first direction Y.

In some embodiments, the redundant net 110R may be generated between the first and second peripheral nets 120 and 130.

In some embodiments, the redundant net 110R may have a larger width than the first target net 110. For example, as illustrated in FIG. 5, a width W21, in the second direction X, of the redundant net 110R may be greater than a width W11, in the second direction X, of the first target net 110.

In some embodiments, the analyzing of the peripheral nets adjacent to the first target net 110, i.e., Block 1220, may include analyzing the distance between peripheral nets adjacent to both sides of the first target net 110. For example, Block 1220 may include measuring a distance D11, in the second direction X, between the first target net 110 and the first peripheral net 120 and a distance D12, in the second direction X, between the first target net 110 and the second peripheral net 130. In a case where the distances D11 and D12 exceed a predetermined distance, the redundant net 110R, which has a larger width than the first target net 110, may be generated (Block 1232a).

Thereafter, the first and second redundant vias 112R and 114R, which have a larger width than the first and second target vias 112 and 114, may be generated (Block 1234a).

The first redundant via 112R may electrically connect the redundant net 110R and the first crossing net 210, which are disposed on different levels. The second redundant via 114R may be spaced apart from the first redundant via 112R and may electrically connect the redundant net 110R and the second crossing net 220, which are disposed on different levels.

FIG. 5 illustrates the redundant net 110R as extending in the first direction Y beyond the first and second redundant vias 112R and 114R, but the present disclosure is not limited thereto. For example, at least one of the first and second redundant vias 112R and 114R may be disposed at an end of the redundant net 110R as long as the first and second redundant vias 112R and 114R can be electrically connected to the redundant net 110R.

In some embodiments, the first and second redundant vias 112R and 114R may have a larger width than the first and second target vias 112 and 114. For example, as illustrated in FIG. 5, a width W22, in the second direction X, of the first redundant via 112R may be greater than a width W12, in the second direction X, of the first target via 112.

FIG. 5 illustrates the first and second redundant vias 112R and 114R as both having a larger width than the first and second target vias 112 and 114, but the present disclosure is not limited thereto. For example, the first redundant via 112R may have a larger width than the first target via 112, and the second redundant via 114R may have substantially the same width as the second target via 114.

A distance E12 between the first and second redundant vias 112R and 114R is illustrated as being the same as a distance E11 between the first and second target vias 112 and 114, but the present disclosure is not limited thereto.

Thereafter, the first target net 110 and the first and second target vias 112 and 114 may be replaced with the redundant net 110R and the first and second redundant vias 112R and 114R, respectively (Block 1236a).

In some embodiments, the performing of a design rule test, i.e., Block 30, may include performing a design rule test on the redundant net 110R and the first and second redundant vias 112R and 114R. For example, the performing of a design rule test on the redundant net 110R may include measuring a distance D21 between the redundant net 110R and the first peripheral net 120 and a distance D22 between the redundant net 110R and the second peripheral net 130.

In some embodiments, if the distances D21 and D22 satisfy a predetermined design rule, a resultant design layout including the redundant net 110R may be provided.

The method of fabricating a semiconductor device according to FIGS. 1 through 5 can generate a redundant net and redundant vias for a pattern (i.e., the target pattern) that is predicted to be bad in the target design layout and can thus provide a semiconductor device with improved reliability.

Figure 6:
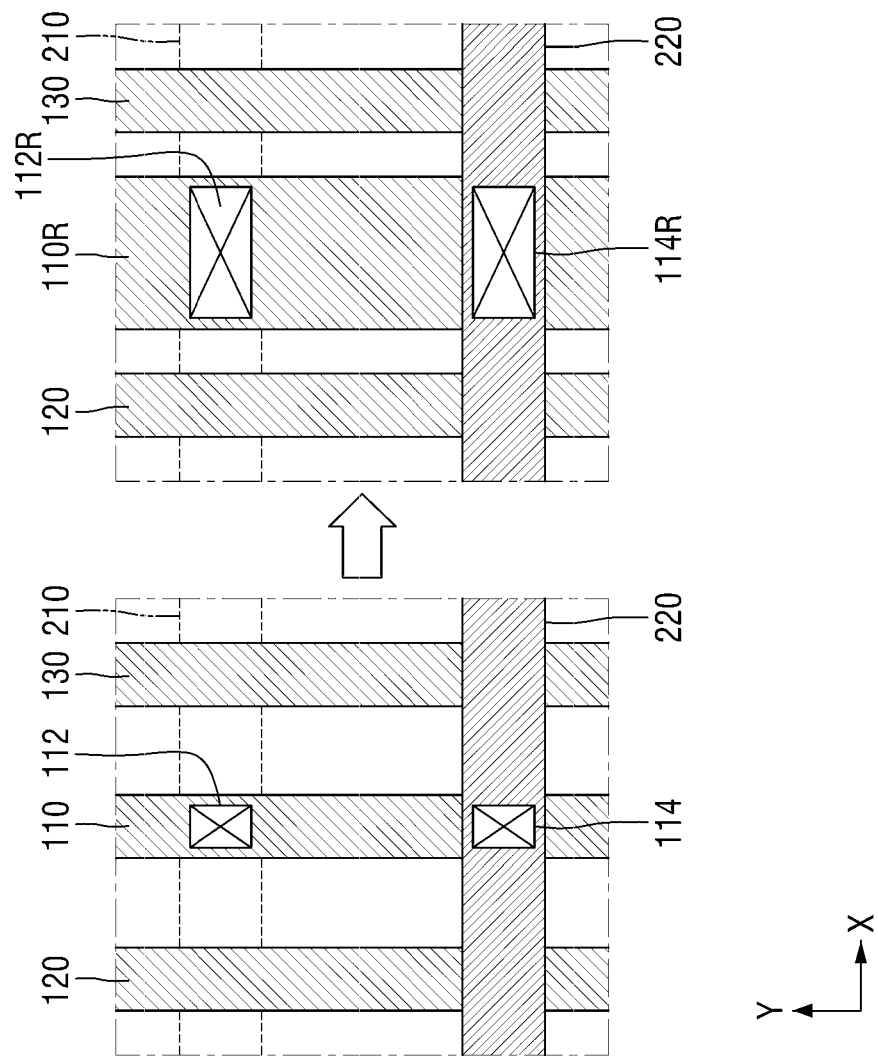
FIG. 6 is a schematic view illustrating the generation of a redundant net and redundant vias according to some embodiments of the present disclosure.

FIG. 6 is a schematic view illustrating the generation of a redundant net and redundant vias according to some embodiments of the present disclosure. For convenience, descriptions of elements or features that have already been described above with reference to FIGS. 1 through 5 may be omitted or at least simplified.

Referring to FIG. 6, in a method of fabricating a semiconductor device according to some embodiments of the present disclosure, first and second crossing nets 210 and 220 may be disposed on different levels.

For example, the first crossing net 210 may be disposed in a lower level than a redundant net 110R, and the second crossing net 220 may be disposed in a higher level than the redundant net 110R.

A first redundant via 112R may electrically connect the redundant net 110R and the first crossing net 210, and a second redundant via 114R may connect the redundant net 110R and the second crossing net 220. Accordingly, the first and second redundant vias 112R and 114R can be disposed on different respective levels in a third direction that intersects the first direction Y and the second direction X. The first and second redundant vias 112R and 114R may replace the first and second target vias 112 and 114, respectively.

Figure 7:
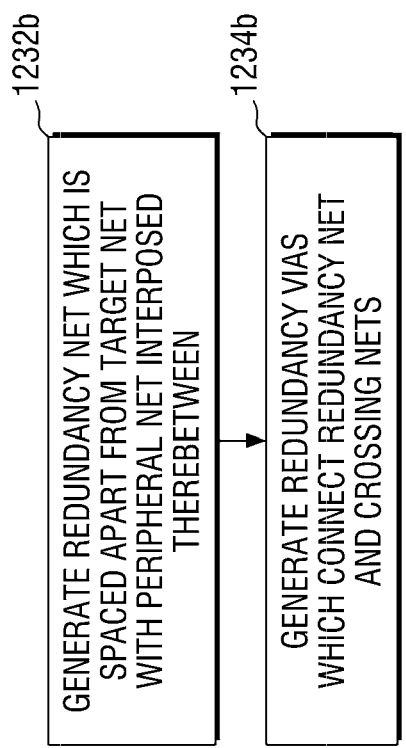
FIG. 7 is a flowchart illustrating the generation of a redundant net and redundant vias according to some embodiments of the present disclosure.
Figure 8:
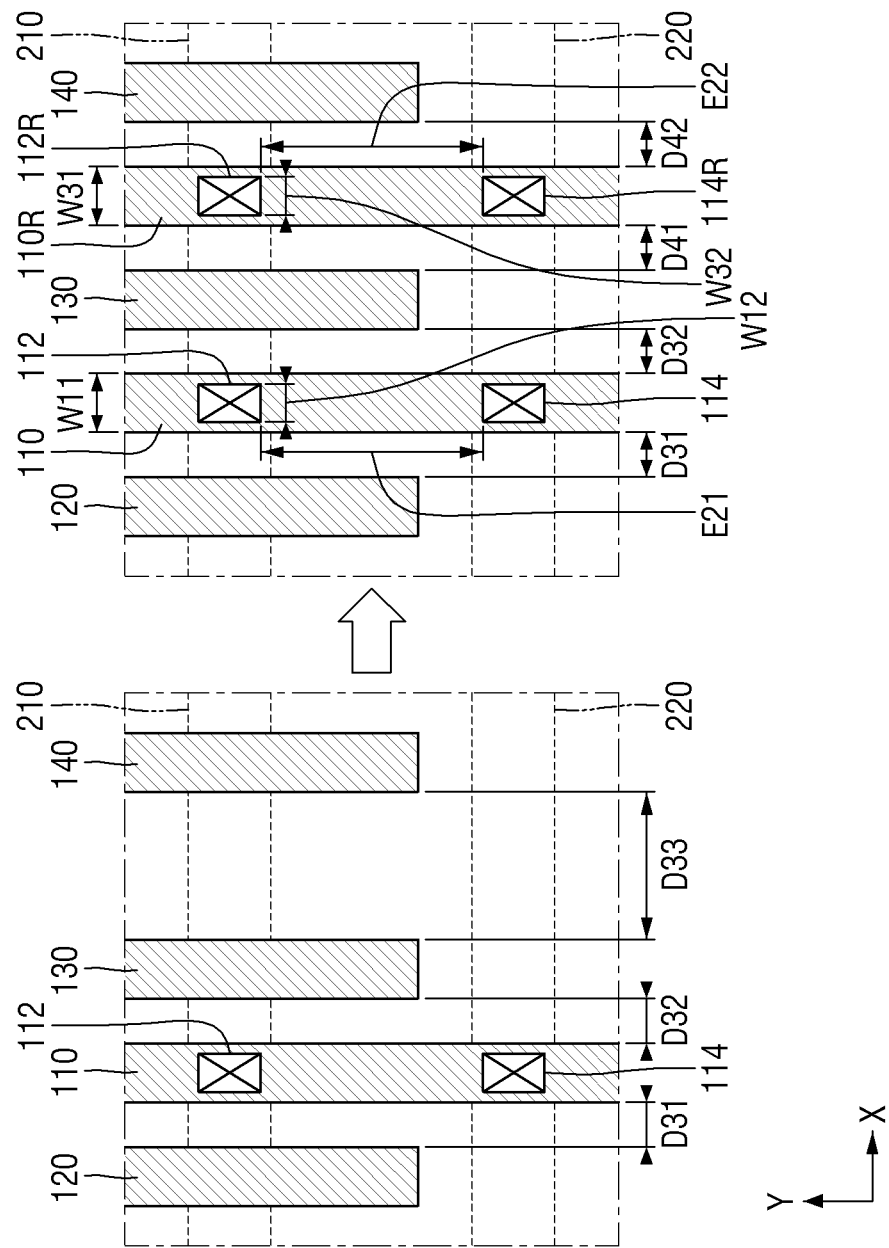
FIG. 8 is a schematic view illustrating the generation of a redundant net and redundant vias according to FIG. 7.

FIG. 7 is a flowchart illustrating the generation of a redundant net and redundant vias according to some embodiments of the present disclosure. FIG. 8 is a schematic view illustrating the generation of a redundant net and redundant vias according to FIG. 7. For convenience, descriptions of elements or features that have already been described above with reference to FIGS. 1 through 6 may be omitted or at least simplified.

Referring to FIGS. 7 and 8, in a method of fabricating a semiconductor device according to some embodiments of the present disclosure, the generation of a redundant net and redundant vias may include generating a redundant net 110R spaced apart from a first target net 110 with a peripheral net (e.g., a second peripheral net 130) of the first target net 110 interposed therebetween (Block 1232b) and generating first and second redundant vias 112R and 114R electrically connecting the redundant net 110R and first and second crossing nets 210 and 220 (Block 1234b).

Specifically, the redundant net 110R, which is spaced apart from the first target net 110 with a peripheral net, e.g., the second peripheral net 130, interposed therebetween, may be generated (Block 1232b).

In some embodiments, a third peripheral net 140 may be disposed adjacent to the second peripheral net 130. For example, the third peripheral net 140 may be spaced apart from the first target net 110 with the second peripheral net 130 interposed therebetween.

A first peripheral net 120, the second peripheral net 130, and the third peripheral net 140 are illustrated as not crossing the second crossing net 220, but the present disclosure is not limited thereto. For example, at least one of the first, second, and third peripheral nets 120, 130, and 140 may cross (e.g., vertically overlap) the second crossing net 220.

In some embodiments, the redundant net 110R may be generated between the second and third peripheral nets 130 and 140. Accordingly, the redundant net 110R can be spaced apart from the first target net 110 with the second peripheral net 130 interposed therebetween.

In some embodiments, the analyzing of the peripheral nets adjacent to the first target net 110, i.e., Block 1220 (FIG. 3A), may include analyzing the distance between the peripheral nets adjacent to the first target net 110. For example, Block 1220 may include a distance D33, in the second direction X, between the second and third peripheral nets 130 and 140. If the distance D33 exceeds a predetermined distance, the redundant net 110R may be generated between the second and third peripheral nets 130 and 140 (Block 1232b).

In some embodiments, the distance D33 between the second and third peripheral nets 130 and 140 may be greater than a distance D31, in the second direction X, between the first target net 110 and the first peripheral net 120 and a distance D32, in the second direction X, between the first target net 110 and the second peripheral net 130.

A width W31, in a second direction X, of the redundant net 110R is illustrated as being the same as a width W11, in the second direction X, of the first target net 110, but the present disclosure is not limited thereto. For example, the redundant net 110R may have a different width from the first target net 110.

Thereafter, the first and second redundant vias 112R and 114R, which electrically connect the redundant net 110R and the first and second crossing nets 210 and 220, may be generated (Block 1234b).

The first redundant via 112R may electrically connect the redundant net 110R and the first crossing net 210, which are disposed on different levels. The second redundant via 114R may be spaced apart from the first redundant via 112R and may electrically connect the redundant net 110R and the second crossing net 220, which are disposed on different levels.

A width W32, in the second direction X, of the first redundant via 112R is illustrated as being the same as a width W12, in the second direction X, of the first target via 112, but the present disclosure is not limited thereto. For example, the first redundant via 112R may have a different width from the first target via 112. Similarly, the second redundant via 114R may have a different width from the second target via 114.

In some embodiments, a distance E22 between the first and second redundant vias 112R and 114R may be substantially the same as a distance E21 between the first and second target vias 112 and 114.

In some embodiments, the performing of a design rule test, i.e., Block 30, may include performing a design rule test on the redundant net 110R and the first and second redundant vias 112R and 114R. For example, the performing of a design rule test on the redundant net 110R may include measuring a distance D41, in the second direction X, between the redundant net 110R and the second peripheral net 130 and a distance D42, in the second direction X, between the redundant net 110R and the third peripheral net 140.

In some embodiments, if the distances D41 and D42 satisfy a predetermined design rule, a resultant design layout including the redundant net 110R may be provided.

The method of fabricating a semiconductor device according to FIGS. 7 and 8 can generate a redundant net and redundant vias that can complement a pattern (i.e., a target pattern) that is predicted to be bad in a target design layout, and can thus provide a semiconductor device with improved reliability.

Figure 9:
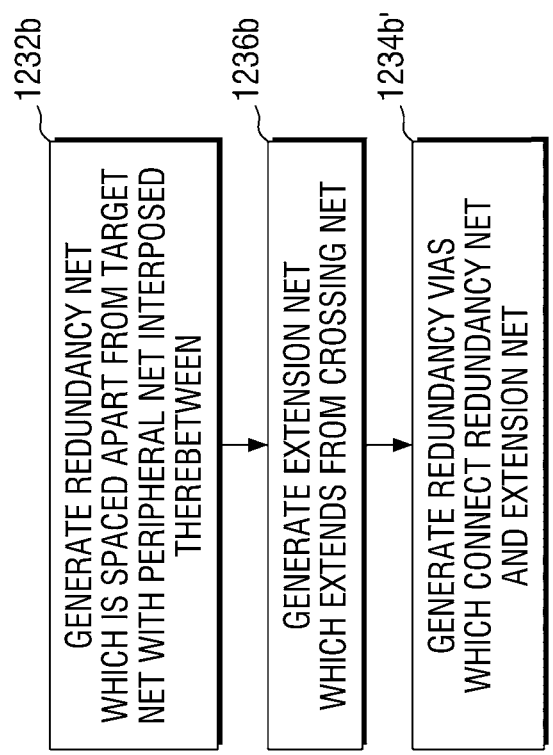
FIG. 9 is a flowchart illustrating the generation of a redundant net and redundant vias according to some embodiments of the present disclosure.
Figure 10:
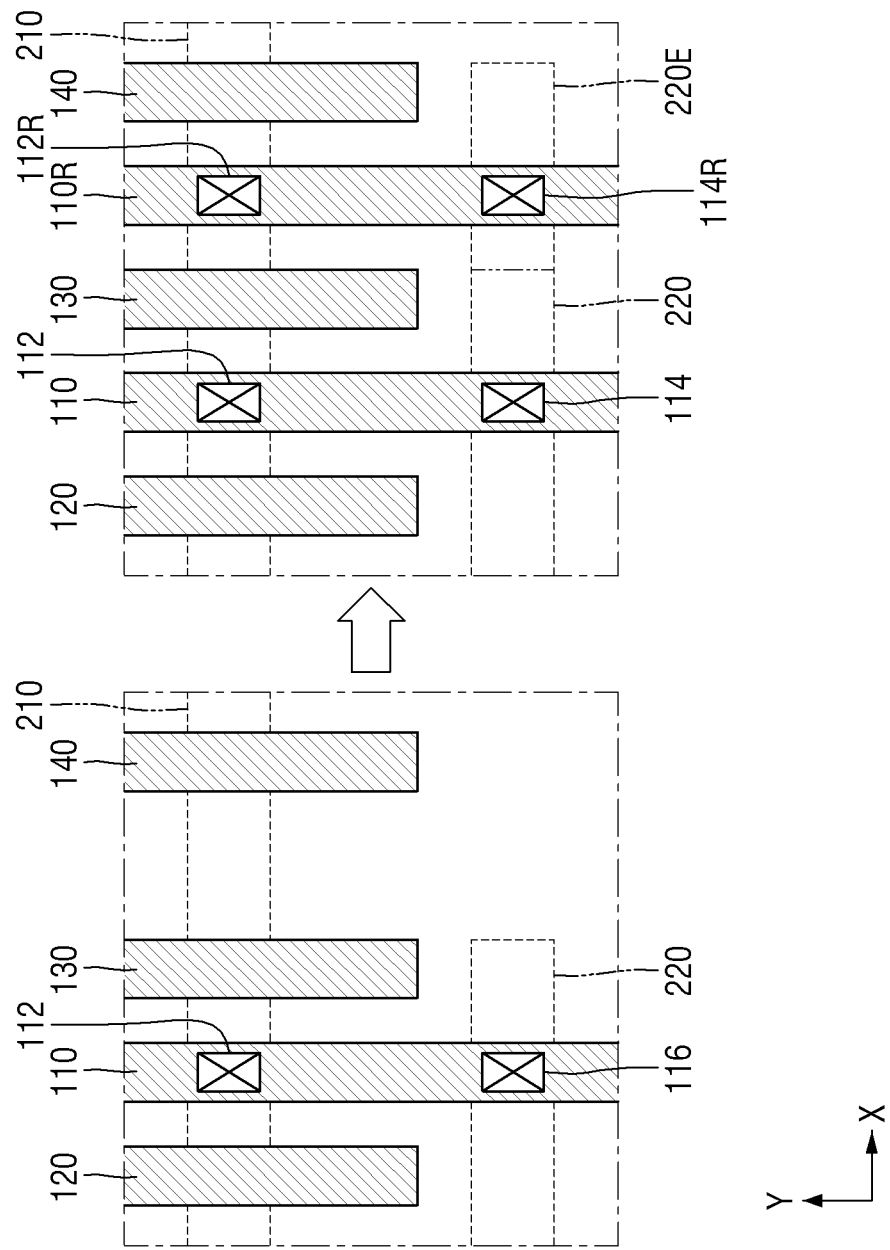
FIG. 10 is a schematic view illustrating the generation of a redundant net and redundant vias according to FIG. 9.

FIG. 9 is a flowchart illustrating the generation of a redundant net and redundant vias according to some embodiments of the present disclosure. FIG. 10 is a schematic view illustrating the generation of a redundant net and redundant vias according to FIG. 9. For convenience, descriptions of elements or features that have already been described above with reference to FIGS. 1 through 8 may be omitted or at least simplified.

Referring to FIGS. 9 and 10, in a method of fabricating a semiconductor device according to some embodiments of the present disclosure, the generation of a redundant net and redundant vias may include generating a redundant net 110R which is spaced apart from a first target net 110 with a peripheral net (e.g., a second peripheral net 130) of the first target net 110 interposed therebetween (Block 1232b), generating an extension net 220E which extends from a crossing net (e.g., a second crossing net 220) (Block 1236b), and generating a second redundant via 114R which electrically connects the redundant net 110R and the extension net 220E (Block 1234b').

In some embodiments, a second target via 114 may be disposed at an end of the second crossing net 220. For example, the second crossing net 220 may not extend to an area between the second peripheral net 130 and a third peripheral net 140. Accordingly, the second crossing net 220 may not overlap with the redundant net 110R.

The extension net 220E may extend from an end of the second crossing net 220 in a second direction X. Accordingly, the extension net 220E can extend even to the area between the second and third peripheral nets 130 and 140. Also, the extension net 220E may overlap with the redundant net 110R. The extension net 220E may be disposed on the same level as the second crossing net 220.

Thereafter, the second target via 114R, which electrically connects the redundant net 110R and the extension net 220E, may be generated (Block 1234b'). Accordingly, the second redundant via 114R can be spaced apart from a first redundant via 112R and can electrically connect the redundant net 110R and the second crossing net 220, which are disposed on different levels. In some embodiments, the second redundant via 114R may be directly connected to the extension net 220E.

Figure 11:
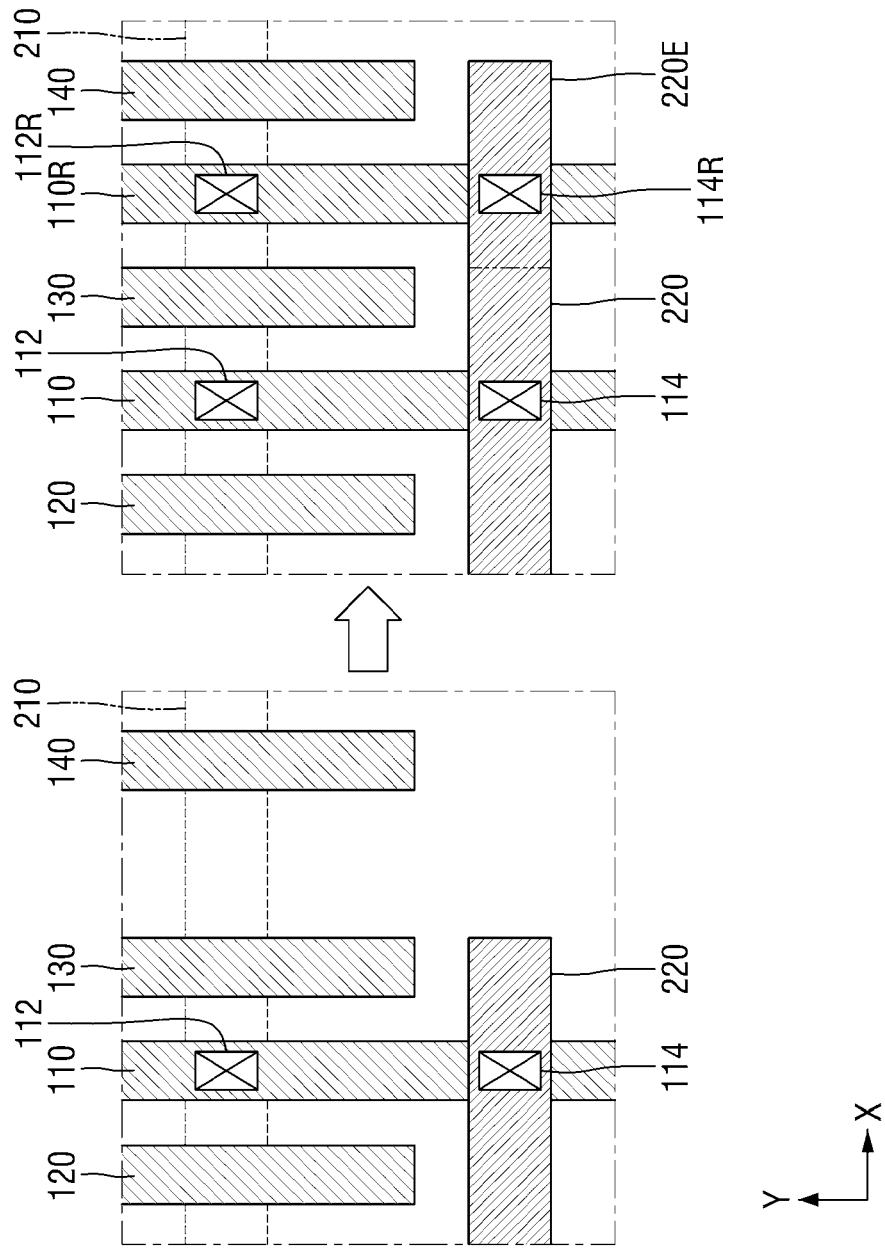
FIG. 11 is a schematic view illustrating the generation of a redundant net and redundant vias according to some embodiments of the present disclosure.

FIG. 11 is a schematic view illustrating the generation of a redundant net and redundant vias according to some embodiments of the present disclosure. For convenience, descriptions of elements or features that have already been described above with reference to FIGS. 1 through 10 may be omitted or at least simplified.

Referring to FIG. 11, in a method of fabricating a semiconductor device according to some embodiments of the present disclosure, first and second crossing nets 210 and 220 may be disposed on different respective levels.

For example, as illustrated in FIG. 11, the first crossing net 210 may be disposed in a lower level than a first target net 110 and a redundant net 110R, and the second crossing net 220 and an extension net 220E may be disposed in a higher level than the first target net 110 and the redundant net 110R. Accordingly, first and second target vias 112 and 114 can be disposed on different respective levels, and first and second redundant vias 112R and 114R may be disposed on different respective levels.

Figure 12:
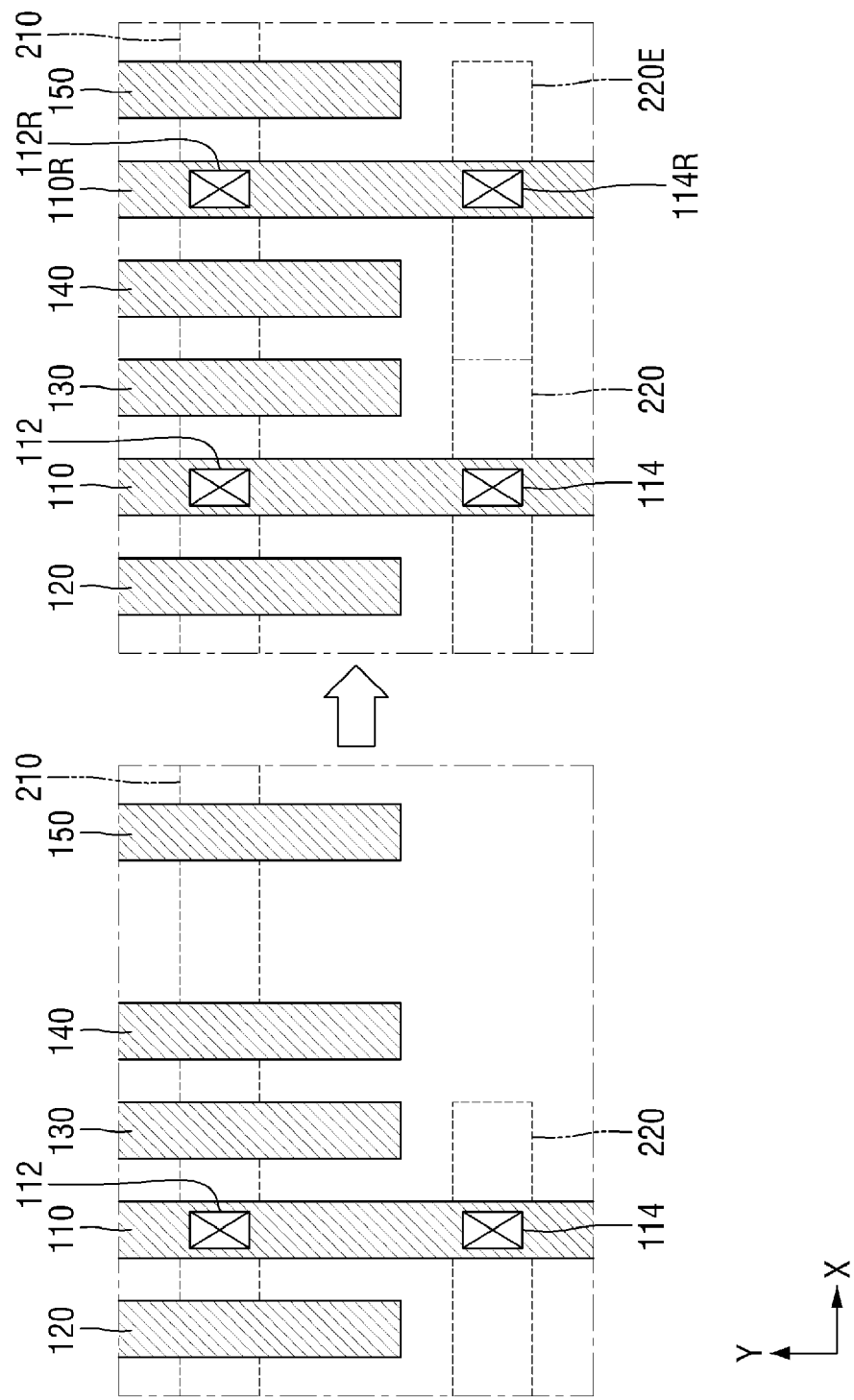
FIG. 12 is a schematic view illustrating the generation of a redundant net and redundant vias according to some embodiments of the present disclosure.

FIG. 12 is a schematic view illustrating the generation of a redundant net and redundant vias according to some embodiments of the present disclosure. For convenience, descriptions of elements or features that have already been described above with reference to FIGS. 1 through 10 may be omitted or at least simplified.

Referring to FIG. 12, in a method of fabricating a semiconductor device according to some embodiments of the present disclosure, a plurality of peripheral nets (e.g., second and third peripheral nets 130 and 140) may be interposed between a first target net 110 and a redundant net 110R.

In some embodiments, a fourth peripheral net 150 may be disposed adjacent to the third peripheral net 140. For example, the fourth peripheral net 150 may be spaced apart from the first target net 110 with the second and third peripheral nets 130 and 140 interposed therebetween.

In some embodiments, the redundant net 110R may be generated between the third and fourth peripheral nets 140 and 150. Accordingly, the redundant net 110R can be spaced apart from the first target net 110 with the second and third peripheral nets 130 and 140 interposed therebetween.

Figure 13:
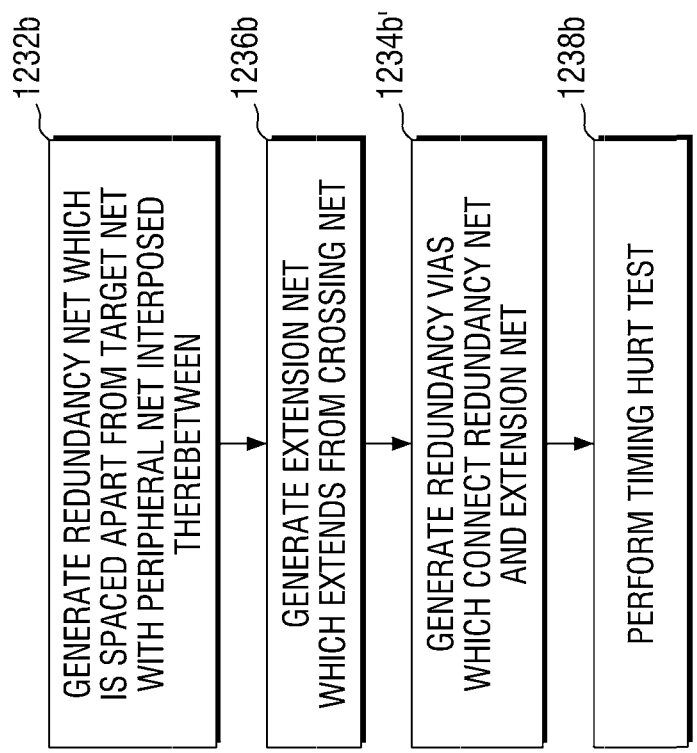
FIG. 13 is a flowchart illustrating the generation of a redundant net and redundant vias according to some embodiments of the present disclosure.
Figure 14:
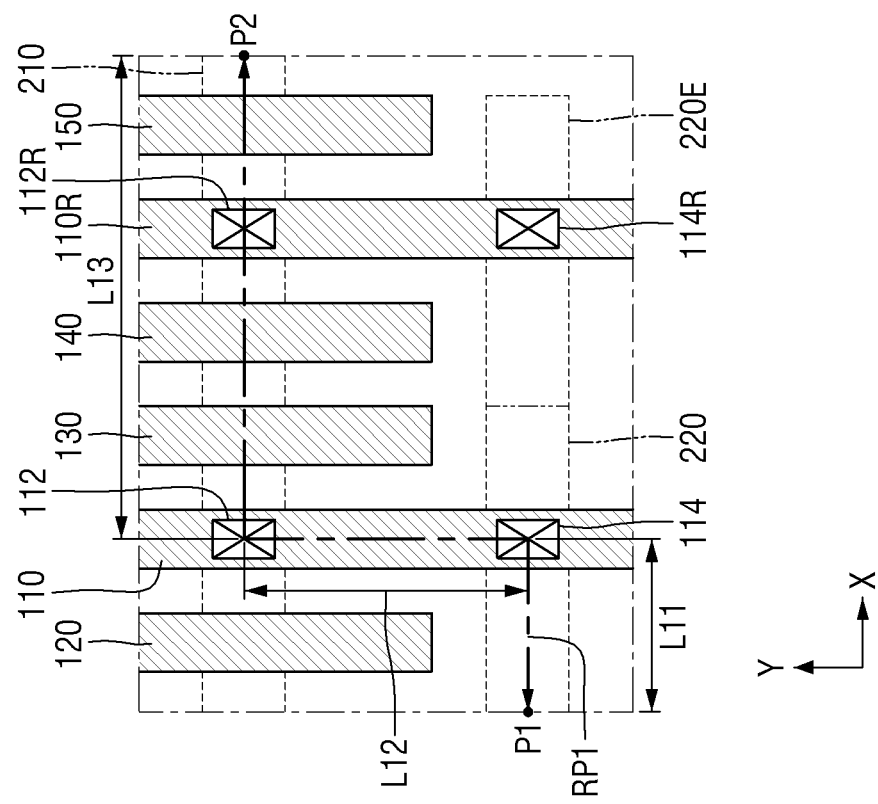
FIGS. 14 and 15 are schematic views illustrating the performing of a timing hurt test according to FIG. 13.
Figure 15:
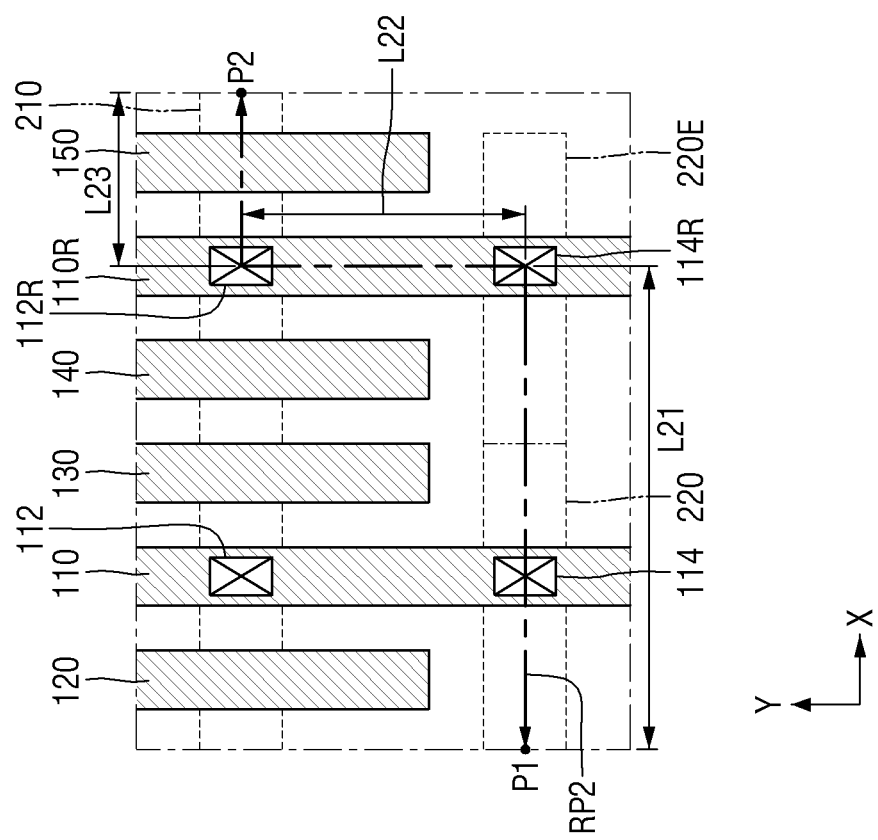

FIG. 13 is a flowchart illustrating the generation of a redundant net and redundant vias according to some embodiments of the present disclosure. FIGS. 14 and 15 are schematic views illustrating the performing of a timing hurt test according to FIG. 13. For convenience, descriptions of elements or features that have already been described above with reference to FIGS. 1 through 10 may be omitted or at least simplified.

Referring to FIGS. 13 through 15, in a method of fabricating a semiconductor device according to some embodiments of the present disclosure, the generation of a redundant net and redundant vias may further include performing a timing hurt test on a generated redundant net and generated redundant vias (Block 1238b).

The timing hurt test may be performed by, for example, measuring the length of a generated wiring path. The term "wiring path", as used herein, refers to a path via which electrical signals are transmitted.

For example, if the length of a wiring path for the generated redundant net is substantially the same as the length of a wiring path for a target net, a resultant design layout including the generated redundant net and the generated redundant vias may be provided. On the other hand, if the wiring path for the generated redundant net is longer than the wiring path for the target net, the generated redundant net and the generated redundant vias may be removed from a target design layout.

For example, first and second wiring paths RP1 and RP2 which extend from a point P1 on the left of a second crossing net 220 to a second point P2 on the right of a first crossing net 210 may be defined.

The first wiring path RP1 may extend from the first point P1 to the second point P2, passing through a first target net 110. For example, as illustrated in FIG. 14, the length of the first wiring path RP1 may be the sum of a distance L11, in the second direction X, from the first point P1 to a second target via 114 along a second crossing net 220, a distance L12, in the first direction Y, from the second target via 114 to a first target via 112 along the first target net 110, and a distance L13, in the second direction X, from the first target via 112 to the second point P2.

The second wiring path RP2 may extend from the first point P1 to the second point P2, passing through a redundant net 110R. For example, as illustrated in FIG. 15, the length of the second wiring path RP2 may be the sum of a distance L21, in the second direction X, from the first point P1 to a second redundant via 114R along the second crossing net 220, a distance L22, in the first direction Y, from the second redundant via 114R to a first redundant via 112R along the first redundant net 110R, and a distance L23, in the second direction X, from the first redundant via 112R to the second point P2.

In some embodiments, the length of the first wiring path RP1, i.e., the sum of the distances L11, L12, and L13, may be substantially the same as the length of the second wiring path RP2, i.e., the sum of the distances L21, L22, and L23. Accordingly, a resultant design layout including the redundant net 110R can be provided.

Figure 16:
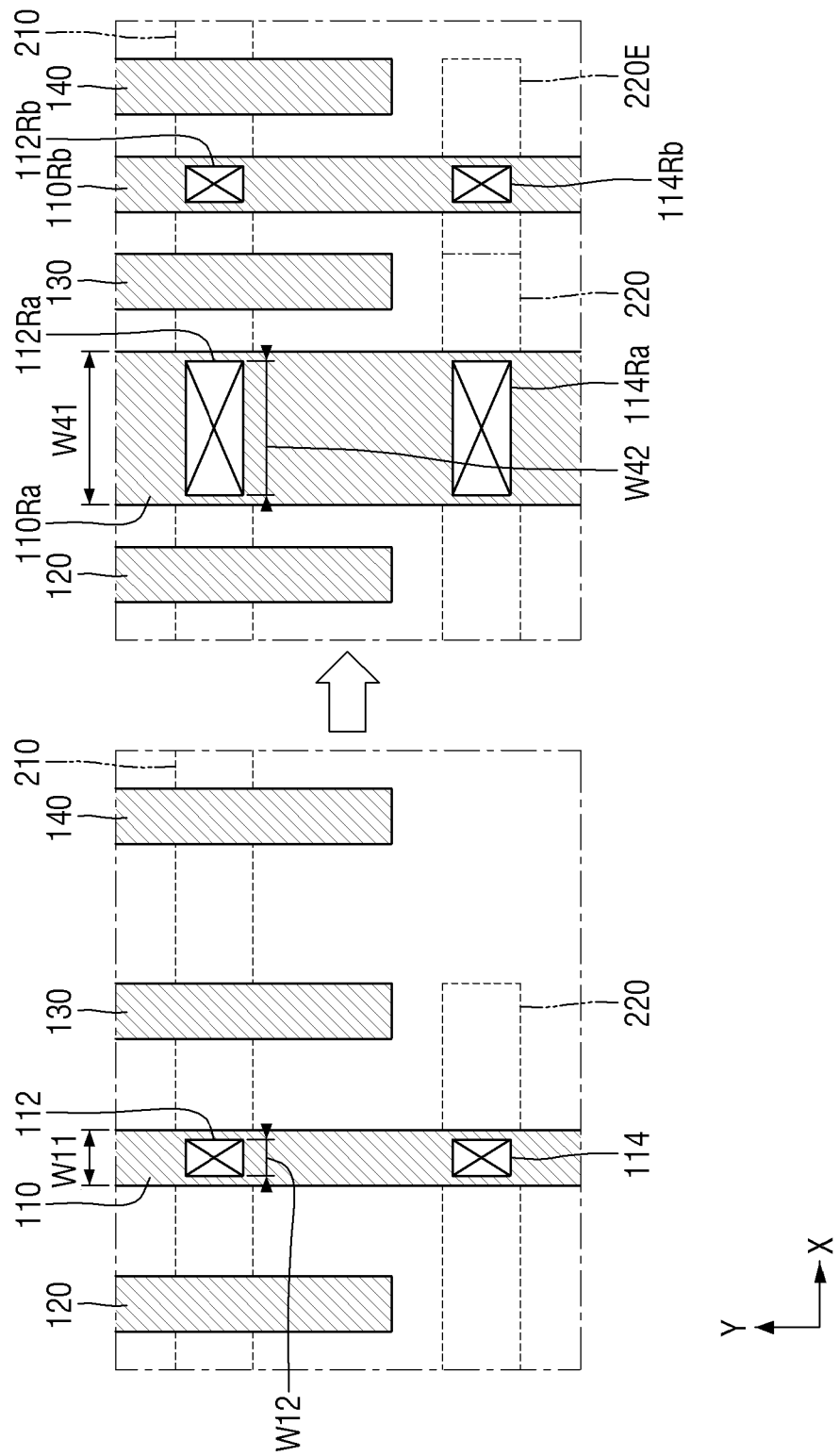
FIG. 16 is a schematic view illustrating the generation of a redundant net and redundant vias according to some embodiments of the present disclosure.

FIG. 16 is a schematic view illustrating the generation of a redundant net and redundant vias according to some embodiments of the present disclosure. For convenience, descriptions of elements or features that have already been described above with reference to FIGS. 1 through 15 may be omitted or at least simplified.

Referring to FIG. 16, in a method of fabricating a semiconductor device according to some embodiments of the present disclosure, a plurality of redundant nets, i.e., first and second redundant nets 110Ra and 110Rb, may be generated.

For example, the first redundant net 110Ra, which has a larger width than a first target net 110, may be generated between first and second peripheral nets 120 and 130. For example, a width W41, in a second direction X, of the first redundant net 110Ra may be greater than a width W11, in the second direction X, of the first target net 110.

In some embodiments, first and second redundant vias 112Ra and 114Ra, which are electrically connected to the first redundant net 110Ra, may have a larger width than first and second target vias 112 and 114. For example, a width W42, in the second direction X, of the first redundant via 112Ra may be greater than a width W12, in the second direction X, of the first target via 112.

Also, for example, the second redundant net 110Rb, which is spaced apart from the first target net 110 with the second peripheral net 130 interposed therebetween, may be generated. For example, the second redundant net 110Rb may be generated between the second peripheral net 130 and a third peripheral net 140.

In some embodiments, a third redundant via 112Rb, which electrically connects the second redundant net 110Rb and a first crossing net 210, and a fourth redundant via 114Rb, which electrically connects the second redundant net 110Rb and a second crossing net 220, may be generated.

Figure 17:
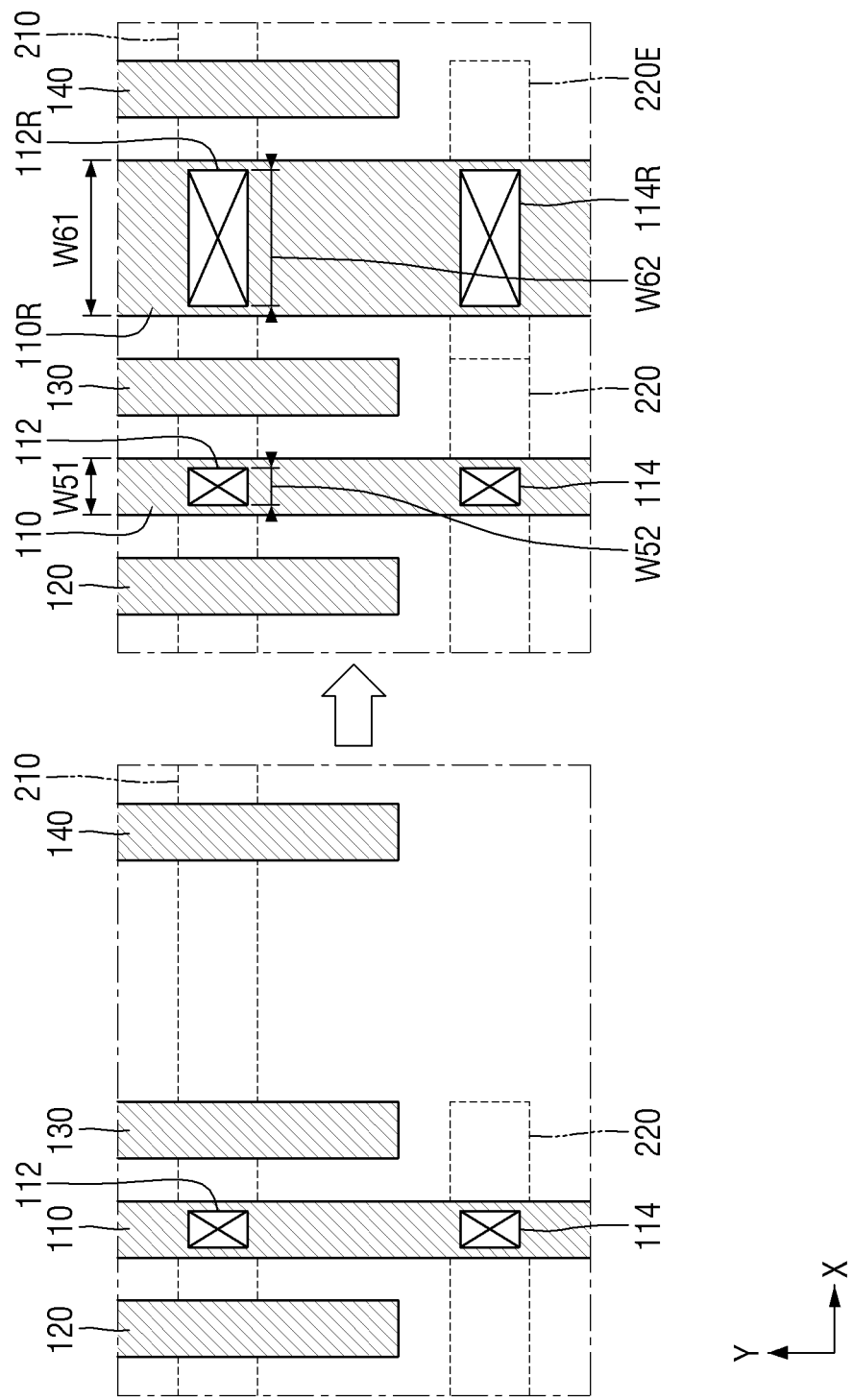
FIG. 17 is a schematic view illustrating the generation of a redundant net and redundant vias according to some embodiments of the present disclosure.

FIG. 17 is a schematic view illustrating the generation of a redundant net and redundant vias according to some embodiments of the present disclosure. For convenience, descriptions of elements or features that have already been described above with reference to FIGS. 1 through 15 may be omitted or at least simplified.

Referring to FIG. 17, in a method of fabricating a semiconductor device according to some embodiments of the present disclosure, a redundant net 110R, which has a larger width than a first target net 110 and is spaced apart from the first target net 110 with a peripheral net interposed therebetween, may be generated.

For example, the redundant net 110R, which has a larger width than the first target net 110, may be disposed between second and third peripheral nets 130 and 140. For example, a width W61, in a second direction X, of the redundant net 110R may be greater than a width W51, in the second direction X, of the first target net 110.

In some embodiments, first and second redundant vias 112R and 114R may have a larger width than first and second target vias 112 and 114. For example, a width W62, in the second direction X, of the first redundant via 112R may be greater than a width W52, in the second direction X, of the first target via 112.

Figure 18:
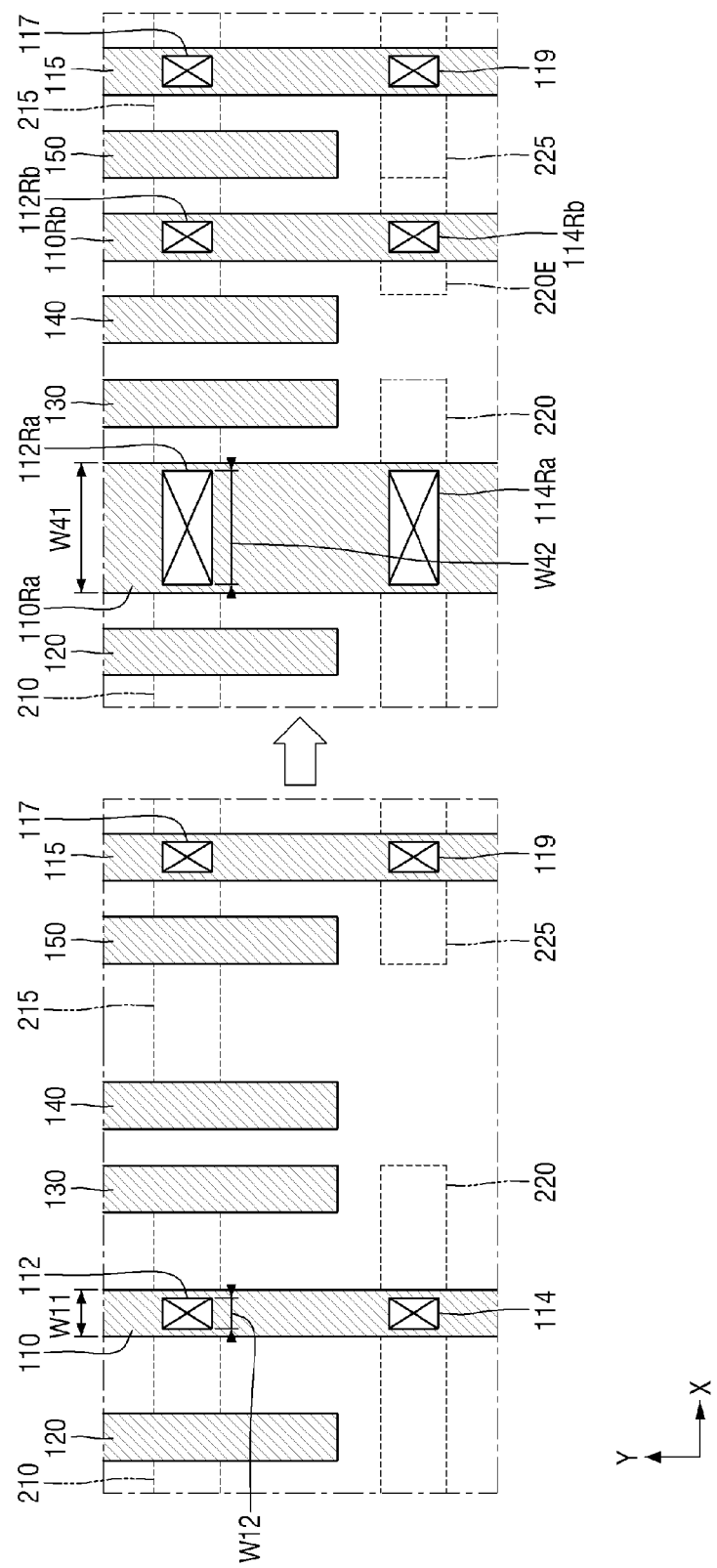
FIG. 18 is a schematic view illustrating the generation of a redundant net and redundant vias according to some embodiments of the present disclosure.

FIG. 18 is a schematic view illustrating the generation of a redundant net and redundant vias according to some embodiments of the present disclosure. For convenience, descriptions of elements or features that have already been described above with reference to FIGS. 1 through 17 may be omitted or at least simplified.

Referring to FIG. 18, in a method of fabricating a semiconductor device according to some embodiments of the present disclosure, a redundant net and redundant vias may be generated for each target net when there are two or more target nets.

For example, a target design layout may include a first target net 110, first and second target vias 112 and 114, and first and second crossing nets 210 and 220 and may further include a second target net 115, third and fourth target vias 117 and 119, and third and fourth crossing nets 215 and 225.

The second target net 115, like the first target net 110, may be a net that is predicted to be bad in the target design layout. The second target net 115 may be spaced apart from the first target net 110. For example, the second target net 115 may perform a different function from the first target net 110. The second target net 115 is illustrated as extending in a first direction Y, but the present disclosure is not limited thereto.

The third and fourth crossing nets 215 and 225 may intersect the second target net 115. For example, the third crossing net 215 may extend in a second direction X, and the fourth crossing net 225 may be spaced apart from the second crossing net 220 and may extend in the second direction X. The third and fourth crossing nets 215 and 225 may be disposed on a different level from the first target net 110. In some embodiments, the third crossing net 215 may be spaced apart from the first crossing net 210, and the fourth crossing net 225 may be spaced apart from the second crossing net 220.

The third target via 117 may electrically connect the second target net 115 and the third crossing net 215, which are disposed on different levels. The fourth target via 119 may be spaced apart from the third target via 117 and may electrically connect the second target net 115 and the fourth crossing net 225, which are disposed on different levels.

In some embodiments, a first redundant net 110Ra corresponding to the first target net 110 may be generated, and a second redundant net 110Rb corresponding to the second target net 115 may be generated. Similarly, first and second redundant vias 112Ra and 114Ra corresponding to the first and second target vias 112 and 114 may be generated, and third and fourth redundant vias 112Rb and 114Rb corresponding to the third and fourth target vias 117 and 119 may be generated.

For example, the first redundant net 110Ra, which has a larger width than the first target net 110, may be generated between first and second peripheral nets 120 and 130. For example, a width W41, in the second direction X, of the first redundant net 110Ra may be greater than a width W11, in the second direction X, of the first target net 110.

In some embodiments, the first and second redundant vias 112Ra and 114Ra, which are electrically connected to the first redundant net 110Ra, may have a larger width than the first and second target vias 112 and 114. For example, a width W42, in the second direction X, of the first redundant via 112Ra may be greater than a width W12, in the second direction X, of the first target via 112.

Also, for example, the second redundant net 110Rb, which is spaced apart from the second target net 115 with a fourth peripheral net 150 interposed therebetween, may be generated. The second redundant net 110Rb may be spaced apart from the first redundant net 110Ra. For example, the second redundant net 110Rb may be generated between the third and fourth peripheral nets 140 and 150.

In some embodiments, an extension net 220E may extend from an end of the fourth crossing net 225 in the second direction X. Accordingly, the fourth redundant via 114Rb can electrically connect the second redundant net 110Rb and the fourth crossing net 225.

A layout design system according to some embodiments of the present disclosure will hereinafter be described with reference to FIGS. 1 through 21.

Figure 19:
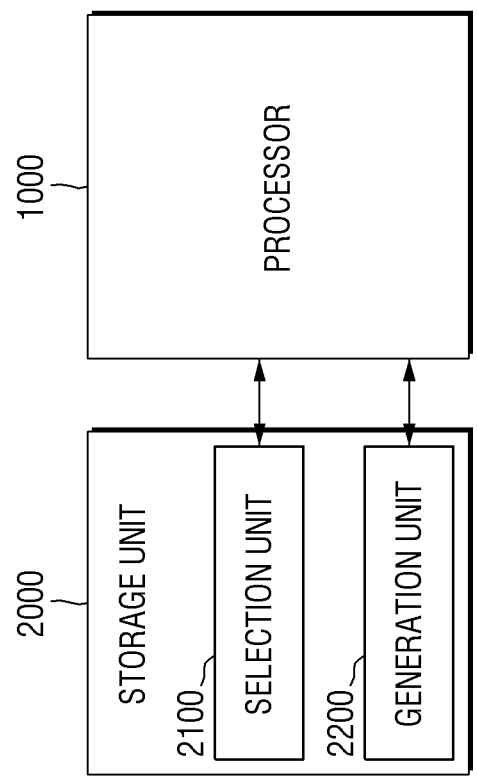
FIG. 19 is a block diagram of a layout design system according to some embodiments of the present disclosure.
Figure 20:
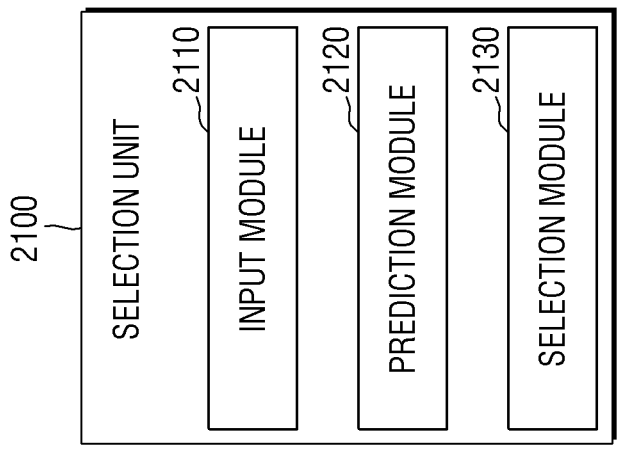
FIG. 20 is a block diagram of a selection unit of FIG. 19.
Figure 21:
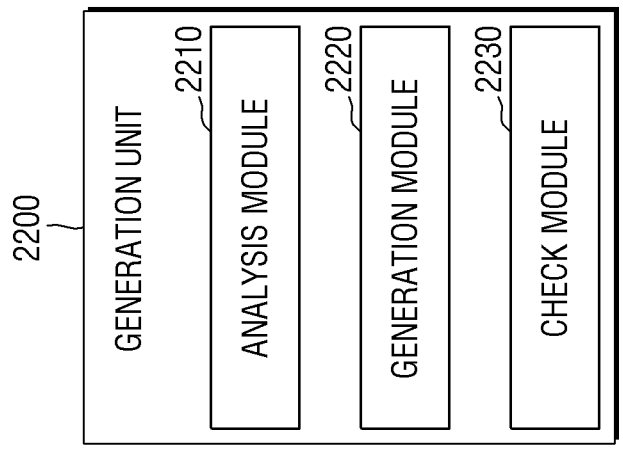
FIG. 21 is a block diagram of a generation unit of FIG. 19.

FIG. 19 is a block diagram of a layout design system according to some embodiments of the present disclosure. FIG. 20 is a block diagram of a selection unit of FIG. 19. FIG. 21 is a block diagram of a generation unit of FIG. 19.

The term "unit" or "module", as used herein, means, but is not limited to, a software and/or hardware component, such as a field programmable gate array (FPGA) or an application specific integrated circuit (ASIC), which performs certain tasks.

A unit or module may advantageously be configured to reside in a tangible addressable storage medium and be configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and units or modules may be combined into fewer components and units or modules or further separated into additional components and units or modules.

Referring to FIGS. 19 through 21, the layout design system includes a processor 1000 and a storage unit 2000.

The storage unit 2000 may include a selection unit 2100 and a generation unit 2200.

The selection unit 2100 may select a target pattern from a target design layout of a semiconductor device, using the processor 1000. In some embodiments, the selection unit 2100 may include an input module 2110, a prediction module 2120, and a selection module 2130.

The input module 2110 may be provided with a database (e.g., "DB" of FIG. 2B) including design information and process information of a semiconductor device.

The prediction module 2120 may generate a prediction model (e.g., "PM" of FIG. 2B), which predicts a bad pattern of a semiconductor device, using machine learning based on the database provided by the input module 2110.

The selection module 2130 may select a target pattern that is predicted as a bad pattern from the target design layout, using the prediction model provided by the prediction module 2120.

The generation unit 2200 may generate a redundant net and redundant vias in the target pattern selected by the selection module 2130, using the processor 1000. In some embodiments, the generation unit 2200 may include an analysis module 2210, a generation module 2220, and a check module 2230.

The analysis module 2210 may analyze a peripheral pattern (including, for example, the first and second peripheral nets 120 and 130 of FIG. 3B) adjacent to the target pattern selected by the selection module 2130.

The generation module 2220 may generate a redundant net (e.g., the redundant net 110R of FIG. 5) and redundant vias (e.g., the first and second redundant vias 112R and 114R of FIG. 5) based on the peripheral pattern analyzed by the analysis module 2210. The generation module 2220 may generate a redundant net and redundant vias using, for example, any one of the methods described above with reference to FIGS. 4 through 18.

The check module 2230 may check (e.g., test/analyze) the generated redundant net and the generated redundant vias, provided by the generation module 2220, for whether the generated redundant net and the generated redundant vias satisfy a predetermined design rule. If the generated redundant net and the generated redundant vias satisfy the predetermined design rule, the check module 2230 may provide a resultant design layout including the generated redundant net and the generated redundant vias.

Though the present inventive concepts have been particularly shown and described with reference to example embodiments thereof, it will be understood by those of ordinary skill in the art that various changes in form and details may be made therein without departing from the scope of the present inventive concepts as defined by the following claims. It is therefore desired that the present embodiments be considered in all respects as illustrative and not restrictive, reference being made to the appended claims rather than the foregoing description to indicate the scope of the invention.

What is claimed is:

1. A method of fabricating a semiconductor device, the method comprising:
providing a database comprising design information and process information of the semiconductor device;
generating a prediction model by performing machine learning using a feature set that is based on the database, wherein the prediction model predicts a bad pattern of the semiconductor device;
selecting a target pattern from a target design layout using the prediction model, wherein the target pattern comprises:
a target net;
a target via that is electrically connected to the target net; and
a crossing net that is electrically connected to the target via on a different level from the target net;
analyzing a peripheral pattern that is adjacent the target net;
generating a redundant net that intersects the crossing net on the same level as the target net, and a redundant via that electrically connects the redundant net and the crossing net, based on the analyzing the peripheral pattern; and
checking the redundant net and the redundant via for whether the redundant net and the redundant via satisfy a predetermined design rule,
wherein the feature set comprises a first feature set comprising features of a normal pattern, and a second feature set comprising features of the bad pattern.

2. The method of claim 1,
wherein the peripheral pattern comprises a first peripheral net and a second peripheral net,
wherein the target net is between the first peripheral net and the second peripheral net, before the generating the redundant net and the redundant via, and
wherein the analyzing the peripheral pattern comprises measuring:
a first distance between the target net and the first peripheral net; and
a second distance between the target net and the second peripheral net.

3. The method of claim 1,
wherein the peripheral pattern comprises a first peripheral net and a second peripheral net,
wherein the first peripheral net is between the target net and the second peripheral net, and
wherein the analyzing the peripheral pattern comprises measuring a distance between the first peripheral net and the second peripheral net.

4. The method of claim 1,
wherein the redundant net is wider, in a direction, than the target net,
wherein the redundant via is wider, in the direction, than the target via, and
wherein the generating the redundant net and the redundant via comprises replacing the target net and the target via with the redundant net and the redundant via, respectively.

5. The method of claim 1,
wherein the peripheral pattern comprises a peripheral net that is spaced apart from the target net on the same level as the target net, and
wherein the peripheral net is between the redundant net and the target net.

6. The method of claim 5, further comprising:
performing a timing hurt test on a wiring path that passes through the redundant net, after the generating the redundant net and the redundant via.

7. A method of fabricating a semiconductor device, the method comprising:
providing a target design layout of the semiconductor device;
selecting a target pattern from the target design layout, wherein the target pattern comprises:
a target net that extends in a first direction;
a first target via that is electrically connected to the target net; and
a first crossing net that is electrically connected to the first target via and extends in a second direction that intersects the first direction on a different level from the target net;
analyzing a peripheral pattern that is adjacent the target net, wherein the peripheral pattern comprises a first peripheral net and a second peripheral net that extend in the first direction on the same level as the target net and are spaced apart from each other in the second direction;
generating a redundant net that extends in the first direction on the same level as the target net, between the first peripheral net and the second peripheral net;
generating a first redundant via that electrically connects the redundant net and the first crossing net; and
building the semiconductor device after determining that the redundant net and the first redundant via satisfy a predetermined design rule.

8. The method of claim 7,
wherein the target net is between the first peripheral net and the second peripheral net, before the generating the redundant net, and
wherein the analyzing the peripheral pattern comprises measuring:
a first distance between the target net and the first peripheral net; and
a second distance between the target net and the second peripheral net.

9. The method of claim 8,
wherein the redundant net is wider, in the second direction, than the target net,
wherein the generating the redundant net comprises replacing the target net with the redundant net,
wherein the first redundant via is wider, in the second direction, than the first target via, and
wherein the generating the first redundant via comprises replacing the first target via with the first redundant via.

10. The method of claim 7,
wherein the first peripheral net is between the target net and the second peripheral net, and
wherein the analyzing the peripheral pattern comprises measuring a distance between the first peripheral net and the second peripheral net.

11. The method of claim 7, wherein the target pattern further comprises:
a second target via that is electrically connected to the target net; and
a second crossing net that extends in the second direction on the different level, or on another different level, from the target net and is electrically connected to the second target via.

12. The method of claim 11, further comprising:
generating a second redundant via that electrically connects the redundant net and the second crossing net.

13. The method of claim 12, wherein a first distance between the first redundant via and the second redundant via is substantially equal to a second distance between the first target via and the second target via.

14. The method of claim 11, wherein the first crossing net and the second crossing net are on different respective levels.

15. A method of fabricating a semiconductor device, the method comprising:
providing a target design layout of the semiconductor device;
selecting a target pattern from the target design layout, wherein the target pattern comprises:
a target net that extends in a first direction;
a first target via that is electrically connected to the target net;
a second target via that is spaced apart from the first target via and is electrically connected to the target net;
a first crossing net that is electrically connected to the first target via and extends in a second direction that intersects the first direction on a different level from the target net; and
a second crossing net that is electrically connected to the second target via and extends in the second direction on the different level, or on another different level, from the target net;
analyzing a peripheral pattern that is adjacent the target net, wherein the peripheral pattern comprises a first peripheral net that extends in the first direction on the same level as the target net and is spaced apart from the target net in the second direction;
generating a first redundant net that extends in the first direction on the same level as the target net, wherein the first peripheral net is between the target net and the first redundant net;
generating a first redundant via that electrically connects the first redundant net and the first crossing net, and a second redundant via that electrically connects the first redundant net and the second crossing net; and
building the semiconductor device after determining that the first redundant net and the first redundant via satisfy a predetermined design rule.

16. The method of claim 15, wherein a first length of a first wiring path that passes through the target net and extends from the first crossing net to the second crossing net is substantially equal to a second length of a second wiring path that passes through the first redundant net and extends from the first crossing net to the second crossing net.

17. The method of claim 15, further comprising:
generating an extension net that extends from the second crossing net along the second direction,
wherein the extension net is directly connected to the second redundant via.

18. The method of claim 15, further comprising:
generating a second redundant net that is wider, in the second direction, than the target net; and
replacing the target net with the second redundant net.

19. The method of claim 15,
wherein the first redundant net is wider, in the second direction, than the target net,
wherein the first redundant via is wider, in the second direction, than the first target via, and
wherein the first redundant via is aligned, in the second direction, with the first target via.

* * * * *